(12) United States Patent
Niewels

(10) Patent No.: US 7,780,884 B2
(45) Date of Patent: Aug. 24, 2010

(54) METHOD FOR POST-MOLD TREATMENT OF A MOLDED ARTICLE AND AN APPARATUS FOR IMPLEMENTING THE METHOD

(75) Inventor: Joachim Johannes Niewels, Thornton (CA)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 421 days.

(21) Appl. No.: 11/841,007

(22) Filed: Aug. 20, 2007

(65) Prior Publication Data
US 2009/0051065 A1    Feb. 26, 2009

(51) Int. Cl.
*B29C 49/64* (2006.01)
(52) U.S. Cl. ............... 264/40.6; 264/526; 264/528; 264/340
(58) Field of Classification Search ............ None
See application file for complete search history.

(56) References Cited

U.S. PATENT DOCUMENTS

| | | | |
|---|---|---|---|
| 5,447,426 A | 9/1995 | Gessner et al. | |
| 5,830,403 A | 11/1998 | Fierkens | |
| 5,837,299 A | 11/1998 | Bright et al. | |
| 6,139,789 A | 10/2000 | Neter et al. | |
| 6,770,239 B2 | 8/2004 | Oueslati et al. | |
| 6,802,705 B2 | 10/2004 | Brand et al. | |
| 6,887,418 B2 | 5/2005 | Olaru et al. | |
| 6,986,653 B2 | 1/2006 | Unterlander et al. | |
| 7,104,780 B2 | 9/2006 | Domodossola et al. | |
| 2006/0138696 A1 | 6/2006 | Weinmann | |
| 2008/0136056 A1 | 6/2008 | Scolamiero | |

FOREIGN PATENT DOCUMENTS

| | | |
|---|---|---|
| JP | 2000210940 | 2/2000 |
| WO | 2006060894 A1 | 6/2006 |
| WO | 2007143815 A1 | 12/2007 |
| WO | 2008052305 A1 | 5/2008 |

OTHER PUBLICATIONS

Search Report, 6 pages, 2008.

*Primary Examiner*—Monica A Huson
(74) *Attorney, Agent, or Firm*—Husky Intellectual Property Services

(57) ABSTRACT

Embodiments of the present invention teach a method for post-mold treatment of a molded article and an apparatus for implementing the method. For example, a method of post-mold treatment of a molded article is provided. The method can be implemented in a molded article receptacle. The method comprises at a first instance in time, subjecting the molded article to a first type of post-mold treatment; and at a second instance in time, subjecting the molded article to a second type of post-mold treatment.

21 Claims, 6 Drawing Sheets

METHOD FOR POST-MOLD TREATMENT OF A MOLDED ARTICLE AND AN APPARATUS FOR IMPLEMENTING THE METHOD

TECHNICAL FIELD

The present invention generally relates to, but is not limited to molding systems in general and more specifically, but not limited to, a method for post-mold treatment of a molded article and an apparatus for implementing the method.

BACKGROUND OF THE INVENTION

Molding is a process by virtue of which a molded article can be formed from molding material by using a molding system. Various molded articles can be formed by using the molding process, such as an injection molding process. One example of a molded article that can be formed, for example, from polyethylene terephthalate (PET) material is a preform that is capable of being subsequently blown into a beverage container, such as, a bottle and the like.

A typical molding system includes inter alia an injection unit, a clamp assembly and a mold assembly. The injection unit can be of a reciprocating screw type or of a two-stage type. The clamp assembly includes inter alia a frame, a movable platen, a fixed platen and an actuator for moving the movable platen and to apply tonnage to the mold assembly arranged between the fixed and movable platens. The mold assembly includes inter alia a cold half and a hot half. The hot half is usually associated with one or more cavities (and, hence, also sometimes referred to by those of skill in the art as a "cavity half"), while the cold half is usually associated with one or more cores (and, hence, also sometimes referred to by those of skill in the art as a "core half"). The one or more cavities together with one or more cores define, in use, one or more molding cavities. The hot half can also be associated with a melt distribution system (also referred to sometimes by those of skill in the art as a "hot runner") for melt distribution. The mold assembly can be associated with a number of additional components, such as neck rings, neck ring slides, ejector structures, wear pads, etc.

As an illustration, injection molding of PET material involves heating the PET material (ex. PET pellets, PEN powder, PLA, etc.) to a homogeneous molten state and injecting, under pressure, the so-melted PET material into the one or more molding cavities defined, at least in part, by the aforementioned one or more cavities and one or more cores mounted respectively on a cavity plate and a core plate of the mold assembly. The cavity plate and the core plate are urged together and are held together by clamp force, the clamp force being sufficient enough to keep the cavity and the core plates together against the pressure of the injected PET material. The molding cavity has a shape that substantially corresponds to a final cold-state shape of the molded article to be molded. The so-injected PET material is then cooled to a temperature sufficient to enable ejection of the so-formed molded article from the mold. When cooled, the molded article shrinks inside of the molding cavity and, as such, when the cavity and core plates are urged apart, the molded article tends to remain associated with the core. Accordingly, by urging the core plate away from the cavity plate, the molded article can be demolded, i.e. ejected from the core piece. Ejection structures are known to assist in removing the molded articles from the core halves. Examples of the ejection structures include stripper plates, ejector pins, etc.

One consideration for economical operation of the molding system is cycle time or, in other words, time that elapses between a point in time when the cavity and core halves are closed and the molded articles are formed and a subsequent point in time when they are opened and the molded articles are removed. As one will appreciate, the shorter the cycle time, the higher the number of molded articles that can be produced in a particular mold of a given size in a given time interval. One attempt to minimize the cycle time is a so-called "post-mold treatment" process. Generally speaking, the post-mold treatment process involves removing the molded articles from the mold once they are sufficiently cooled to enable ejection of the molded articles without causing significant deformation to the molded articles during its transfer to an auxiliary cooling structure. Post-mold treatment then occurs independently (but in parallel) to the injection cycle of the molding machine.

An example of the auxiliary cooling structure is disclosed in a commonly owned U.S. Pat. No. 7,104,780 issued to Domodossola et al. on Sep. 12, 2006. More specifically, Domodossola et al. discloses a platen-mounted, post-mold cooling apparatus for handling molded parts in an injection molding machine having a fixed platen, a movable platen, a core half, and a cavity half. A take-off device coupled to the fixed platen is configured to remove molded parts from either the core half or the cavity half. A treatment device coupled to the movable platen is configured to cool the molded parts carried by the take-off device. The take-off device extracts the just molded parts from the mold's core half and then moves linearly outboard of the mold halves. The subsequent movement of the movable platen to close the mold in the next molding cycle causes the treatment device's pins to engage the molded parts in the take-off device part carriers. When the movable platen opens again, the molded parts are extracted from the part carriers by the treatment device pins. When the movable platen is fully open, the treatment device is rotated to eject the cooled parts from the machine.

SUMMARY OF THE INVENTION

According to a first broad aspect of the present invention, there is provided a method of post-mold treatment of a molded article, the method that can be implemented in a molded article receptacle. The method comprises at a first instance in time, subjecting the molded article to a first type of post-mold treatment; and at a second instance in time, subjecting the molded article to a second type of post-mold treatment.

According to a second broad aspect of the present invention, there is provided a method of controlling a post-mold treatment process of a molded article, the method that can be executed at a computing apparatus. The method comprises causing a post-mold treatment device to implement a first portion of the post-mold treatment process, the first portion being associated with a first type of post-mold treatment; causing the post-mold treatment device to implement a second portion of the post-mold treatment process, the second portion being associated with a second type of post-mold treatment.

According to a third broad aspect of the present invention, there is provided a molded article receptacle. The molded article receptacles comprises a body defining a receiving portion for accepting, in use, a molded article; a molded article position adjustment structure for actuating the molded article received within the receiving portion between a first post-mold treatment position and a second post-mold treatment position within the molded article receptacle, whereby in the first post-mold treatment position a first type of post-mold treatment can be applied to the molded article and in the second post-mold treatment position a second type of post-mold treatment can be applied to the molded article.

According to a fourth broad aspect of the present invention, there is provided a molded article receptacle. The molded article receptacle comprises a mechanical ejector rail; and an active end insert, the mechanical ejector rail and the active end insert configured to actuate the molded article between a first position and a second position.

According to another broad aspect of the present invention, there is provided a molding system. The molded system comprises means for molding a molded article; means for post-mold treatment of the molded article, the means for post-mold treatment being configured to implement a first type of post-mold treatment at a first instance in time and a second type of post-mold treatment at a second instance in time.

According to yet another broad aspect of the present invention, there is provided a computer readable storage medium containing a program element for execution by a computing apparatus, the program element for rendering the computing apparatus operable to cause a post-mold treatment device to implement a first portion of a post-mold treatment cycle, the first portion being associated with a first type of post-mold treatment; cause a post-mold treatment device to implement a second portion of the post-mold treatment cycle, the second portion being associated with a second type of post-mold treatment; cause the post-mold treatment device to switch between the first portion and the second portion.

DESCRIPTION OF THE DRAWINGS

A better understanding of the embodiments of the present invention (including alternatives and/or variations thereof) may be obtained with reference to the detailed description of the embodiments along with the following drawings, in which.

The drawings are not necessarily to scale and are may be illustrated by phantom lines, diagrammatic representations and fragmentary views. In certain instances, details that are not necessary for an understanding of the embodiments or that render other details difficult to perceive may have been omitted.

DETAILED DESCRIPTION OF EMBODIMENTS

Figure 1:
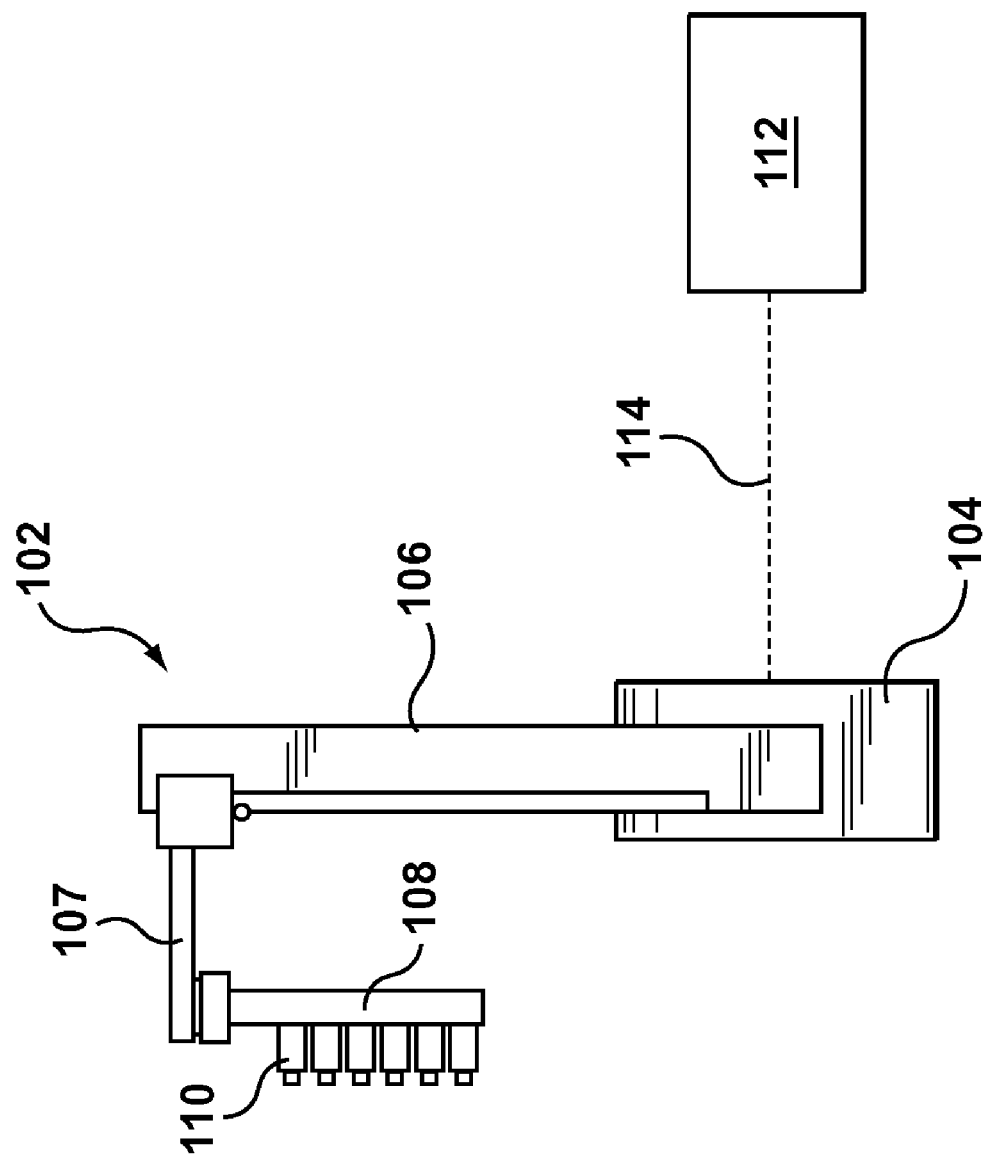
FIG. 1 depicts a non-limiting embodiment of a post-mold treatment device, which can be used to implement embodiments of the present invention.

With reference to FIG. 1, there is depicted a post-mold treatment device 102, which can be adapted to implement embodiments of the present invention. More specifically, FIG. 1 depicts a platen 104 and the post-mold treatment device 102 being operatively coupled to the platen 104. Those skilled in the art will readily appreciate how the post-mold treatment device 102 can be operatively coupled to the platen 104 and, as such, this will not be discussed here at any length.

For illustration purposes only, it shall be assumed that the platen 104 is part of an injection molding system (not depicted) adapted for processing molding material, such as, PET for example, to produce preforms that are subsequently blow-molded into beverage containers (such as, bottles, for example). However, it should be understood that in alternative non-limiting embodiments of the present invention, the platen 104 can be part of other types of molding systems, such as, but not limited to, compression molding systems, molding systems adapted for molding molded articles using other materials and the like. It should be further understood that embodiments of the present invention are applicable to the molding system incorporating any multicavitation mold, including PET molds, thinwall articles molds, closures molds and the like.

The post-mold treatment device 102 comprises a mounting structure 106, an actuating arm 107 coupled to the mounting structure 106 and a take-off plate 108 coupled to the actuating arm 107. The take-off plate 108 comprises a plurality of molded article receptacles 110. Generally speaking, the purpose of the plurality of molded article receptacles 110 is (a) to remove molded articles after they have been produced and sufficiently cooled within one or more molding cavities (not depicted) of the molding system (not depicted); and (b) implement at least a portion of the post-mold treatment process.

The exact number of the plurality of molded article receptacles 110 is not particularly limited and will generally correspond to the number of the one or more molding cavities (not depicted) or a multiple number thereof (which is some times referred to by those of skill in the art as a "multi-position post-mold treatment or cooling process"). For example, if a three-position post-mold treatment cycle is to be implemented and if the molding system comprises 72 instances of the one or more molding cavities (for example, 12 rows of 6), the take-off plate 108 can comprise 216 instances of the plurality of molded article receptacles 110 (i.e. twelve rows of 18). Other configurations are, of course, also possible and are generally limited by business considerations of an entity managing the molding system.

Also schematically depicted in FIG. 1 is a computing apparatus 112. The computing apparatus 112 can be configured to control one or more operation of the molding system (not depicted) in general and the post-mold treatment device 102, in particular. To that extent, there is schematically shown a connection 114 between the computing apparatus 112 and the platen 104. The computing apparatus 112 can be implemented as part of a controller that controls various operations of the molding system. Alternatively, the computing apparatus 112 can be implemented as a separate computing device configured to control only certain operations or operations of a certain component of the molding system (ex. the post-mold treatment device 102). The computing apparatus 112 can comprise internal memory (not depicted) storing one or more instructions for executing one or more routines or a reader (not depicted) for reading one or more type of a computer-readable medium (not depicted) that stores one or more instructions for executing one or more routines.

Even though the connection 114 is depicted between the computing apparatus 112 and the platen 104, this need not be so in every embodiment of the present invention. Accordingly, it should be understood that the computing apparatus 112 can be coupled to other components of the molding system (not depicted), as well as to more than one component of the molding system, either in series or in parallel. Furthermore, it should be understood that the connection 114 can be implemented either as a wireless link, a wired link or as a combination of the two.

Figure 2:
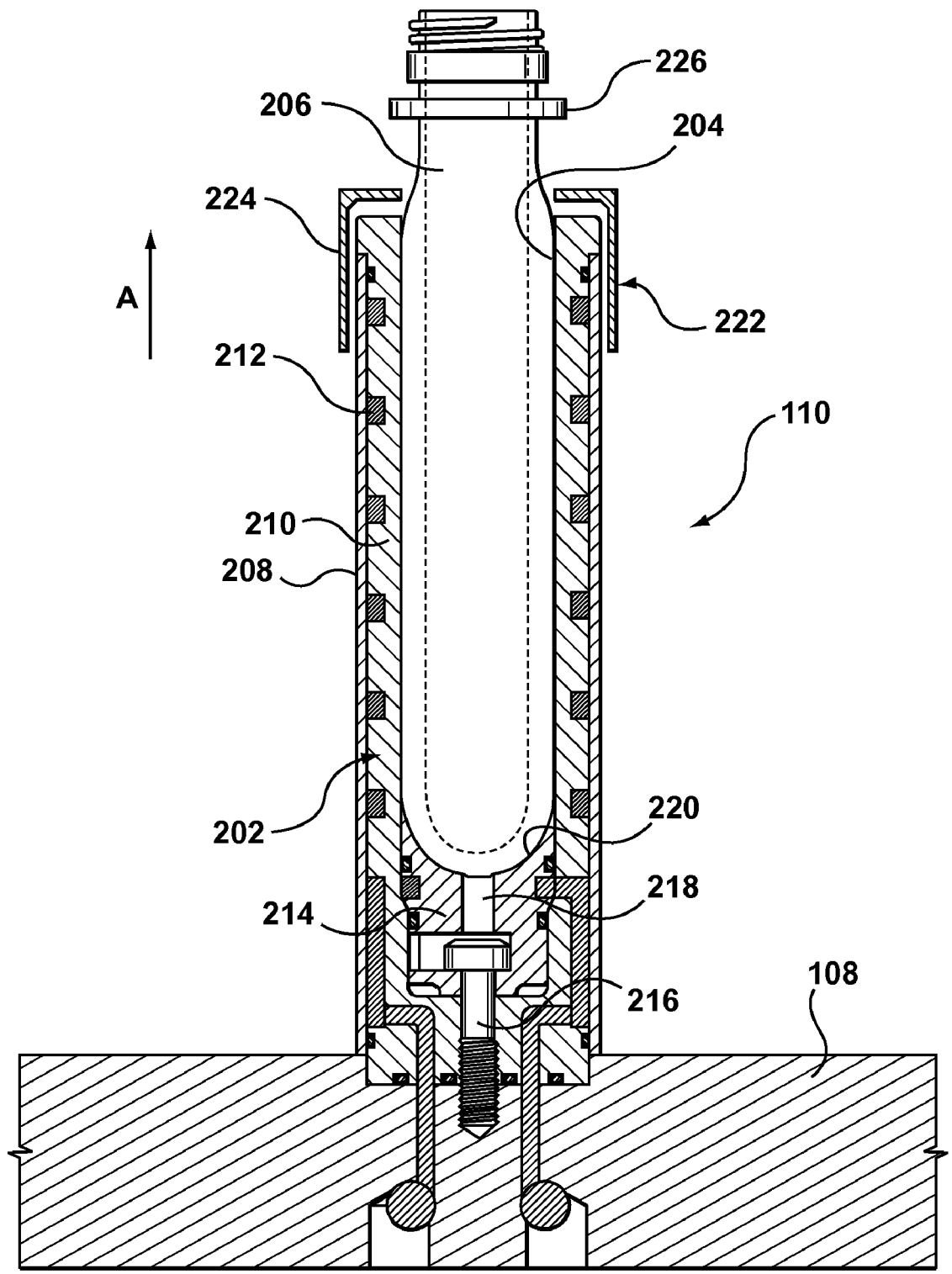
FIG. 2 depicts a molded article receptacle of the post-mold treatment device of FIG. 1, implemented according to a non-limiting embodiment of the present invention.

With reference to FIG. 2, the molded article receptacle 110 of FIG. 1, implemented according to a non-limiting embodiment of the present invention will now be described in greater detail. More specifically, depicted in FIG. 2 is the take-off plate 108 and a single instance of the molded article receptacle 110. However, it should be understood that this is done for ease of illustration and, in practice, the take-off plate 108 can comprise any number of instances of the molded article receptacle 110.

The molded article receptacle 110 comprises a body 202. The body 202 defines a receiving portion 204 for accepting, in use, a molded article 206, which in this case comprises a preform, but this need not be so in every embodiment of the present invention. The body 202 further comprises an outer sleeve 208 and an inner body portion 210. Defined between the inner body portion 210 and the outer sleeve 208 are a plurality of cooling channels 212 for conveying coolant (such as water and the like). It should be noted, however, that the number, shape and location of the plurality of cooling channels 212 is not limited to those depicted in FIG. 2. Other alternative implementations thereof are possible.

The body 202 further comprises an end insert 214. The end insert 214 is configured for attachment of the body 202 to the take-off plate 108. This can be implemented, for example, by using a fastener 216. The end insert 214 further comprises a passageway 218. The passageway 218 is coupled, in use, to a source of air (not depicted), which can be a source of under-pressure air or a selective source of under-pressure and over-pressure air. Even though not depicted in FIG. 2, the passageway 218 can be coupled to the source of air (not depicted) via a conduit (not depicted) in the take-off plate 108, as is known to those of skill in the art. The application of under-pressure air via the passageway 218 has typically been used to assist in transfer of the molded article 206 into the receiving portion 204 or for maintaining a contact between the molded article 206 and an inner surface of the receiving portion 204 as the molded article 206 shrinks over a respective portion of the post-mold treatment cycle.

The end insert 214 comprises an engagement surface 220, the engagement surface 220 having a shape that generally corresponds to a shape of a bottom portion of the molded article 206.

The molded article receptacle 110 further comprises a position adjustment structure 222. Generally speaking and as will be explained in greater detail herein below, the purpose of the position adjustment structure 222 is to adjust a position of the molded article 206 vis-à-vis the molded article receptacle 110. More specifically, the position adjustment structure 222 is actuatable between a first position (i.e. a retracted position shown in FIG. 2) and a second position (i.e. an extended position (not depicted) in a direction of an arrow "A" in FIG. 2) and vice versa.

In the specific non-limiting embodiment of FIG. 2, the position adjustment structure 222 comprises a mechanical ejector rail 224. In the specific non-limiting embodiment of FIG. 2, the mechanical ejector rail 224 can be actuated by any known suitable actuator (not depicted). Examples of a suitable actuator can include, but are not limited to, a piston-cylinder unit, a servo-motor and the like. An example of a suitable actuator is described in more detail in the U.S. Pat. No. 5,447,426 assigned to the Assignee of the present patent application.

Figure 6:
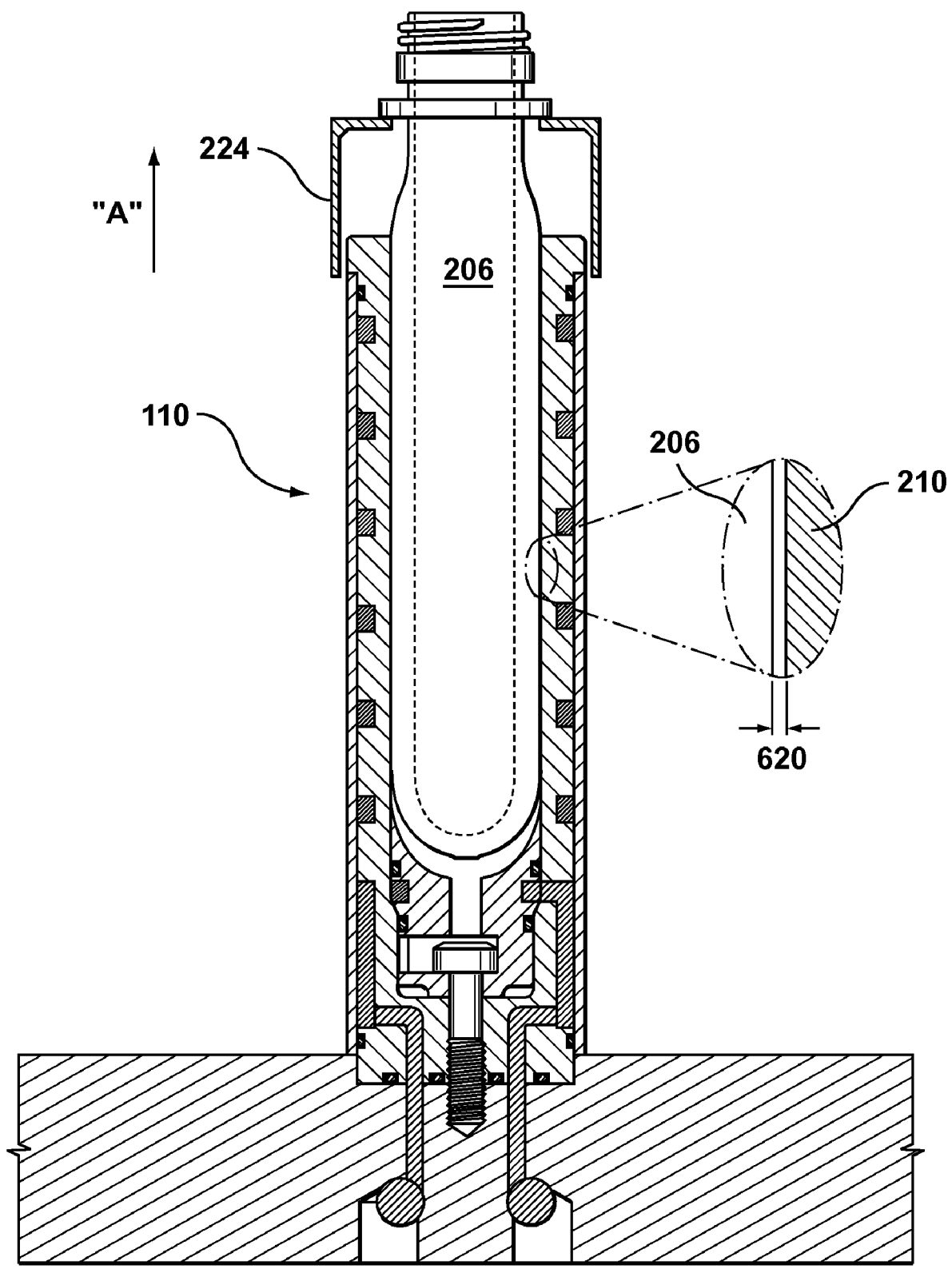
FIG. 6 depicts the molded article receptacle of FIG. 2 with the molded article being in a disengaged position.

The mechanical ejector rail 224 engages a support ledge 226 of the molded article 206 to actuate the molded article 206 between (i) an engaged position depicted in FIG. 2 where a contact is substantially maintained between the molded article 206 and the inner surface of the receiving portion 204 and (ii) a disengaged position where the contact between the molded article 206 and the inner surface of the receiving portion 204 is substantially broken. With reference to FIG. 6, there is depicted an arrangement of FIG. 2 with the molded article 206 being in the disengaged position. As can be seen in FIG. 6, there exists a clearance 620 between the molded article 206 and the inner surface of the receiving portion 204 (i.e. the inner portion of the inner body portion 210). As will be appreciated by those skilled in the art, the clearance 620 between the molded article 206 and the inner surface of the receiving portion 204, in the disengaged position, is attributable at least partially to a draft associated with the molded article 206.

Figure 3:
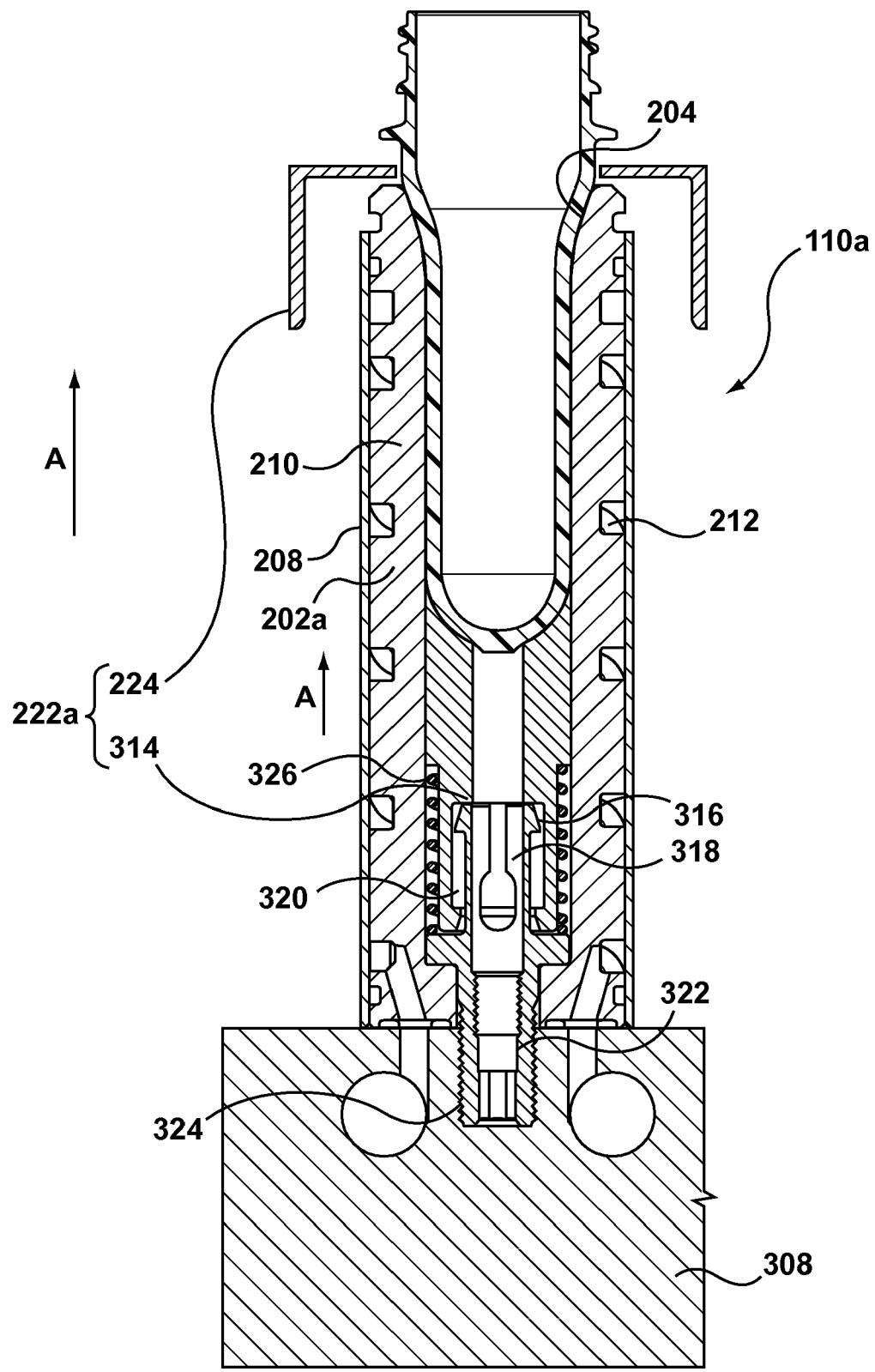
FIG. 3 depicts a molded article receptacle of the post-mold treatment device of FIG. 1, implemented in accordance with another non-limiting embodiment of the present invention.

FIG. 3 depicts another non-limiting embodiment of a molded article receptacle 110a, implemented according to another non-limiting embodiment of the present invention. The molded article receptacle 110a can be substantially similar to the molded article receptacle 110, but for the specific differences described herein below and, as such, like elements will be depicted with like numerals.

The molded article receptacle 110a comprises a body 202a. Similarly to the body 202, the body 202a comprises a receiving portion 204, an outer sleeve 208, an inner body portion 210 and a plurality of cooling channels 212.

The molded article receptacle 110a further comprises an active end insert 314. Similarly to the end insert 214, the active end insert 314 is configured to couple the molded article receptacle 110a to a take-off plate 308. In the specific non-limiting embodiment of FIG. 3, the active end insert 314 is configured to couple the molded article receptacle 110a to the take off plate 308 by means of a fastener 316. The fastener 316 comprises (i) a first end 318 that cooperates with an undercut 320 defined in the active end insert 314 and (ii) a second end 322 that is configured to cooperate with a bore 324, which can be threaded, defined in the take-off plate 308.

It can be seen in FIG. 3, that the first end 318 and the undercut 320 allow the active end insert 314 a degree of axial movement along the first end 318, the degree of movement being delimited by the length of the undercut 320. In other words, the active end insert 314 can be said to have a degree of axial movement (i.e. along an arrow depicted at "A") between a first position (i.e. a retracted position depicted in FIG. 3) and a second position (i.e. an extended position in a direction of arrow "A") and vice versa. The active end insert 314 can further comprise a biasing member 326 (such as a spring and the like) that is configured to bias the active end insert 314 towards the second position. It should be noted that other alternative implementations for the biasing member 326 are possible. For example, the biasing member 326 can be implemented as a resilient member (ex. an elastomer-based member) or as an actuator (such as a hydraulic actuator, for example). Alternatively, the biasing member 326 can be implemented as a member made of a so-called "memory alloy" which can be actuatable between two positions based on the temperature of the member made of the memory alloy.

Within this non-limiting embodiment of the present invention, the mechanical ejector rail 224 and the active end insert 314 can be said to constitute to a position adjustment structure 222a. Within some of these non-limiting embodiments, the active end insert 314 can assist in maintaining orientation of the molded article 206 when it is in the aforementioned disengaged position. More specifically, the active end insert 314 can assist in preventing the molded article 206 from touching an inner surface of the molded article receptacle 110a.

In other embodiments of the present invention, it is contemplated that the active end insert 314 may constitute the position adjustment structure 222a in and of itself and, as such, the mechanical ejector rail 224 can be omitted.

Figure 4:
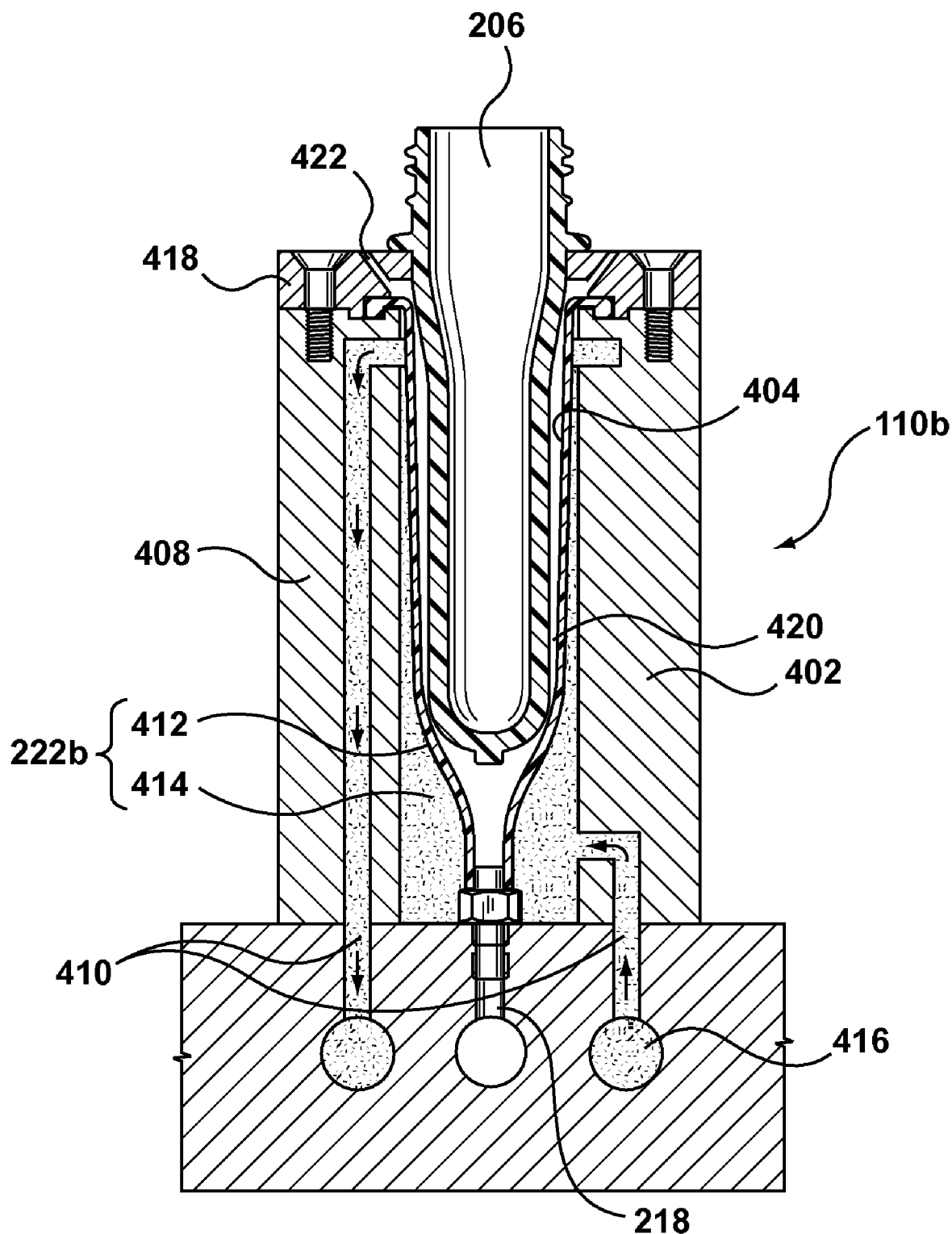
FIG. 4 depicts a molded article receptacle of the post-mold treatment device of FIG. 1, implemented in accordance with another non-limiting embodiment of the present invention.
Figure 5:
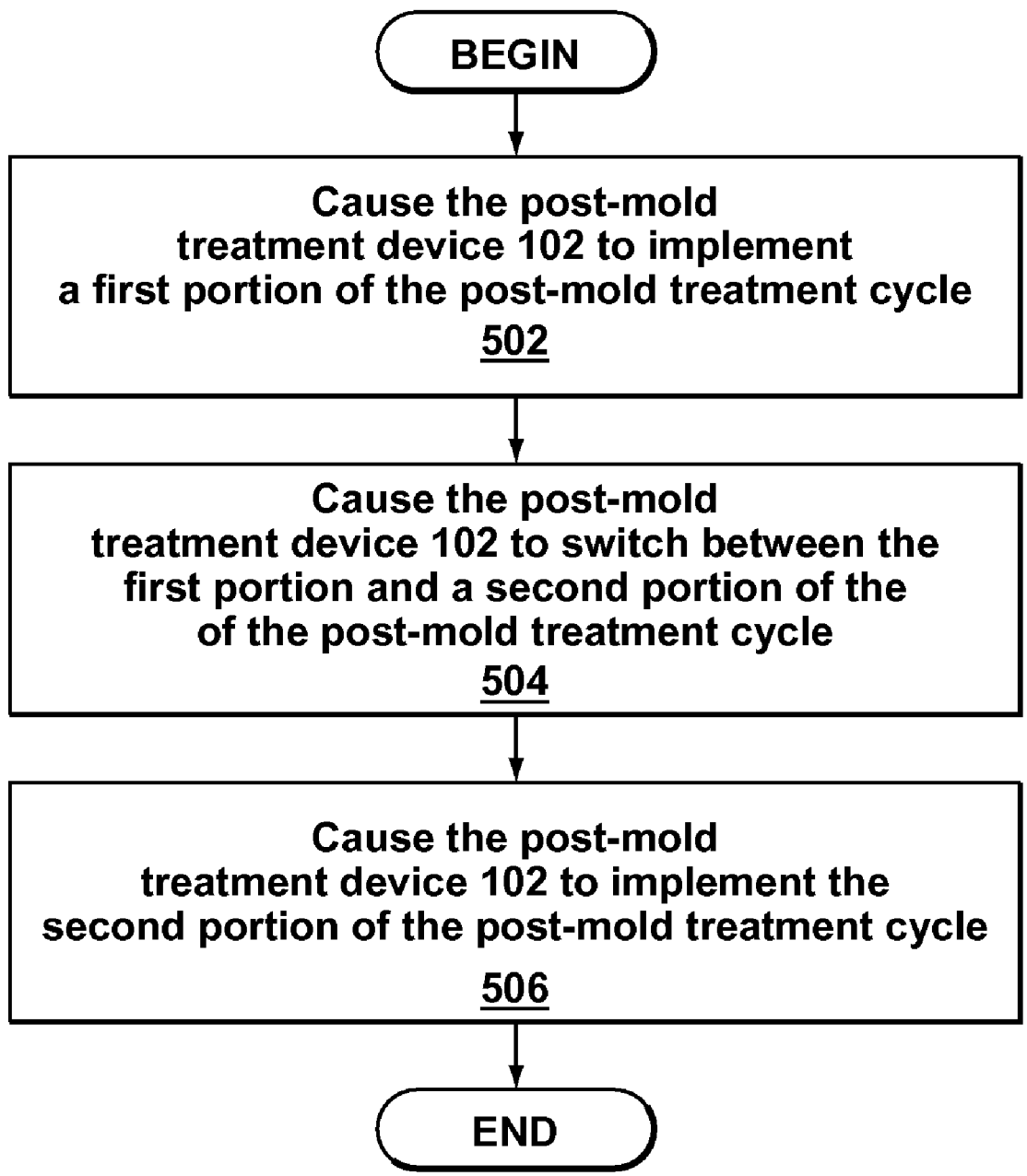
FIG. 5 depicts a flow chart of a method implemented in a computing apparatus associated with the post-mold treatment device of FIG. 1, implemented according to a non-limiting embodiment of the present invention.

With reference to FIG. 4, there is depicted another non-limiting embodiment of a molded article receptacle 110b implemented according to another non-limiting embodiment of the present invention. The molded article receptacle 110b can be substantially similar to the molded article receptacle 110, but for the specific differences described herein below and, as such, like elements will be depicted with like numerals.

One marked difference associated with the molded article receptacle 110b is how a position adjustment structure 222b is implemented. The molded article receptacle 110b comprises a body 402. The body 402 defines a receiving portion 404 for accepting, in use, a molded article 206. The body 402 further comprises an outer sleeve 408. The receiving portion 404 comprises a molded article engaging surface 412. Defined between the inner body portion 410 and the molded article engaging surface 412 is a volume 414. The volume 414 is in communication with a source of coolant 416 via conduits 410. The coolant can be water or any other suitable medium, as is known to those of skill in the art.

The molded article engaging surface 412 is made of a substantially elastic material. An example of such an arrangement is disclosed in a U.S. Pat. No. 5,837,299 issued to Bright et al. on Nov. 17, 1998, however other suitable arrangements can be equally used. Within the implementation of FIG. 4, the molded article engaging surface 412 is coupled to the body 402 by means of a retainer member 418. The size of the volume 414 is responsive to the change of pressure of the coolant flowing from the source of coolant 416. More specifically, responsive to lowering of the pressure, the volume 414 will contract and responsive to increasing of the pressure, the volume 414 will expand.

Accordingly, it can be said that the molded article engaging surface 412 can be controlled between (i) a first position or, put another way, a retracted position depicted in FIG. 4 where there exists a clearance 420 between the molded article 206 and the molded article engaging surface 412, as is shown in FIG. 4 and (ii) a second position or, put another way, an expanded position where the molded article engaging surface 412 engages the molded article 206. The actuation between the retracted position and the expanded position can be implemented by varying the pressure of the coolant flowing from the source of coolant 416.

There is also provided an air inlet 422. The air inlet 422 is defined in the retainer member 422. The air inlet 422 is defined in such a way that (i) it is substantially obstructed by the molded article 206 and the molded article engaging surface 412 when the molded article engaging surface 412 is in the expanded position and (ii) it is substantially unobstructed when the molded article engaging surface 412 in the retracted position, as is the case in FIG. 4. When the air inlet 422 is substantially unobstructed, it provided a path of flow for ambient air through the clearance 420, for example, under applied under-pressure by means of the passageway 218 and the aforementioned source of air (not depicted).

Within this non-limiting embodiment of the present invention, it can be said that the molded article engaging surface 412 and the volume 414 constitute to the position adjustment structure 222b.

Given the architectures described with reference to FIGS. 2-4, it is possible to implement a method of post-mold treatment according to a non-limiting embodiment of the present invention.

According to the method of post-mold treatment, the post-mold treatment cycle can be broadly divided into two portions:

a first portion of the post-mold treatment cycle, where a first type of cooling is applied to the molded article 206; and a second portion of the post-mold treatment cycle, where a second type of cooling is applied to the molded article 206.

Within a specific non-limiting embodiment of the present invention, the first type of cooling can include conduction-based cooling and the second type of cooling can include convection-based cooling. However, in alternative non-limiting embodiments of the present invention, the first type of cooling can include convection-based cooling and the second type of cooling can include conduction-based cooling. In yet further non-limiting embodiments of the present invention, the first type of cooling can include conduction-based cooling and the second type of cooling can include a non-conduction-based cooling (ex. radiation-based cooling, etc.). Other variations for the first type and the second type of cooling are also possible. One example of an alternative type of cooling is cooling that relies, at least partially, on vaporization effect.

The conduction-based cooling can be implemented in substantially traditional manner, and more specifically:

Within the Embodiment of FIG. 2

Within this embodiment of the present invention, the first portion of the post-mold treatment cycle is implemented while the position adjustment structure 222 is in the first position (i.e. the retracted position where there exists a contact between the molded article 206 and the inner surface of the receiving portion 204, as well as between the molded article 206 and the end insert 214). It will be recalled that coolant is circulated via the plurality of cooling channels 212. Accordingly, via conduction between the plurality of cooling channels 212, the inner body portion 210 and the molded article 206, the first portion of the post-mold treatment cycle is implemented.

Within the Embodiment of FIG. 3

Similarly, within the embodiment of FIG. 3, the first portion of the post-mold treatment cycle is implemented while the position adjustment structure 222a is in the first position (i.e. the retracted position where there exists a contact between the molded article 206 and the inner surface of the receiving portion 204, as well as between the molded article 206 and the active end insert 314). It will be recalled that coolant is circulated via the plurality of cooling channels 212. Accordingly, via conduction between the plurality of cooling channels 212, the inner body portion 210 and the molded article 206, the first portion of the post-mold treatment cycle is implemented.

Within the Embodiment of FIG. 4

Within the embodiment of FIG. 4, the first portion of the most mold-treatment cycle is implemented in the following manner. The first portion of the post-mold treatment cycle is implemented while the position adjustment structure 222b is in the first position (i.e. the expanded position where there exists a contact the molded article 206 and the molded article engaging surface 412). It will be recalled that coolant is passing through the volume 414. Accordingly, via conduction between the volume 414, the molded article engaging surface 412 and the molded article 206, the first portion of the post-mold treatment cycle is implemented.

The convection-based cooling can be implemented as follows:

Within the Embodiment of FIG. 2

Within this embodiment of the present invention, the second portion of the post-mold treatment cycle is implemented while the position adjustment structure 222 is in the second position (i.e. the extended position where there exists a clearance 620 between the molded article 206 and the inner surface of the receiving portion 204). The source of under-pressure air can be activated so that ambient air is drawn past the molded article 206 via the clearance 620 between the molded article 206 and the inner surface of the receiving portion 204. Accordingly, the second portion of the post-mold treatment cycle will be implemented by means of convection between the ambient air and the molded article 206.

Within the Embodiment of FIG. 3

Within this embodiment of the present invention, the second portion of the post-mold treatment cycle is implemented while the position adjustment structure 222a is in the second position (i.e. the extended position where there exists a clearance 620 between the molded article 206 and the inner surface of the receiving portion 204, while there is still contact between the active end insert 314 and the molded article 206 (due to the action of the biasing member 326)). The source of under-pressure air can be activated so that ambient air is drawn past the molded article 206 via the clearance 620 between the molded article 206 and the inner surface of the receiving portion 204. Accordingly, the second portion of the post-mold treatment cycle will be implemented by means of convection between the ambient air and the molded article 206.

Within the Embodiment of FIG. 4

Within the embodiment of FIG. 4, the second portion of the most mold-treatment cycle is implemented in the following manner. The second portion of the post-mold treatment cycle is implemented while the position adjustment structure 222b is in the second position (i.e. the retracted position where there exists the clearance 420 between the molded article 206 and the molded article engaging surface 412). The source of under-pressure air can be activated so that ambient air is drawn past the molded article 206 via the air inlet 422 and the clearance 420. Accordingly, the second portion of the post-mold treatment cycle will be implemented by means of convection between the ambient air and the molded article 206.

Control of and, more specifically, switch-over between the first portion of the post-mold treatment cycle and the second portion of the post-mold treatment cycle can be affected in a number of ways. In a specific non-limiting embodiment of the present invention, the switch-over is affected by the computing apparatus 112 of FIG. 1.

To that extent, the computing apparatus 112 is configured to execute a routine for controlling at least the post-mold treatment device 102 to implement post-mold treatment cycle according to various non-limiting embodiments of the present invention. More specifically, the computing apparatus 112 can execute a routine comprising steps 502, 504 and 506:

Step 502:

The computing apparatus 112 causes the post-mold treatment device 102 to implement the first portion of the post-mold treatment cycle. For example, as part of step 502, the computing apparatus 112 can cause the position adjustment structure 222, 222a, 222b to enter the first position (i.e. the retracted position for the position adjustment structure 222, 222a or the expanded position for the position adjustment structure 222b).

Step 504:

The computing apparatus 112 causes the post-mold treatment device 102 to switch between the first portion of the post-mold treatment cycle and the second portion of the post-mold treatment cycle.

As part of step 504, the computing apparatus 112 can cause the position adjustment structure 222, 222a, 222b to enter the second position (i.e. the expanded position for the position adjustment structure 222, 222a or the retracted position for the position adjustment structure 222b).

In some embodiments of the present invention, the computing apparatus 112 can execute the switch over: (a) at a pre-determined time; (b) responsive to a signal. Within a first non-limiting implementation, the pre-determined time can be, for example, selected by an operator or hard-coded into the computing apparatus 112. The pre-determined time can be expressed as a time interval expired since a beginning of the particular post-mold treatment cycle, the number of positions in the multi-position post-mold treatment cycle, etc. Within these embodiments of the present invention, the pre-determined time and the signal can be thought of as "triggers". It should be further noted that other types of triggers can be used, such as but not limited to, changes in the pressure reading associated with the molded article 206 and the inner body portion 210 and the like.

Within a second non-limiting implementation, the computing apparatus 112 can execute the switch over in response to the signal, which can be indicative, of a temperature reached by the molded articles being treated, etc. This signal can be generated by a thermocouple or the like located in all or some of the molded article receptacles 110, 110a, 110b.

Step 506:

The computing apparatus 112 causes the post-mold treatment device 102 to implement the second portion of the post-mold treatment cycle. As part of the step 506, the computing apparatus 112 can, for example, actuate the source of air (not depicted) to supply under-pressure air to the passageway 218 to effect the second stage of post-mold treatment cycle.

In some embodiments of the present invention, step 508 can also be optionally implemented:

Step 508:

The computing apparatus 112 causes the post-mold treatment device 102 to eject the molded article 206. For example, the computing apparatus 112 can cause the mechanical ejector rail 224 to move to a third position (or an ejection position), at which point the molded article 206 is effectively forced out of the molded article receptacle 110. Within these embodiments of the present invention, the mechanical ejector rail 224 can be said to be actuatable between three positions: (a) a retracted position, (b) an extended position (or, in other words, an intermediate position) and (c) an ejection position.

Even though the non-limiting embodiments presented herein above have used examples of a molded article receptacle (such as, for example, the molded article receptacle 110) mounted onto a post-mold treatment device (such as, the post-mold treatment device 102), which in turn is mounted onto the platen 104, this need be so in every implementation of the present invention. In alternative non-limiting embodiments of the present invention, the molded article receptacle 110, 110a, 110b implemented according to embodiments of the present invention can form part of a post-mold treatment device which is auxiliary vis-à-vis the platen and the molding machine (not depicted) in general.

It should be further noted that even though the foregoing description has used ambient air drawn past molded article 206 during the second portion of the post-mold treatment process, this need not be so in every embodiments of the present invention. For example, in an alternative non-limiting embodiment of the present invention, a low-pressure air emitted via the passageway 218 can be for-example used for implementing the second portion of the post-mold treatment process. In yet further non-limiting embodiments of the present invention, at least a portion of the inner body portion 210, for example, can be comprised of porous material and the air can be exerted via the porous material. Yet other alternatives are also possible.

Persons skilled in the art will appreciate that embodiments of the present invention can be adapted for different implementations. For example, one may select the implementation of FIG. 2 where the post-mold treatment is implemented with the molded article receptacle 110 being vertically oriented, while the implementation of FIG. 3 and/or FIG. 4 may be suitable for both vertically and horizontally oriented molded article receptacles 110a.

It will now become apparent that various non-limiting examples of the position adjustment means (such as the position adjustment structure 222, 222a, 222b) have been described. It will now be appreciated that the general purpose of such position adjustment means is to impact relative movement of the molded article 206 vis-à-vis the molded article receptacle 110, 110a, 110b. It should be further appreciated that further alternative implementations for the position adjustment means are possible. For example, it is contemplated, that the position adjustment means can be implemented in the aforementioned air source. Within these embodiments, the air source is activated to push the molded article 206 out of the molded article receptacle 110, 110a, 110b to create a clearance therebetween, such that the second stage of post-mold treatment can be implemented.

A technical effect of embodiments of the present invention may include decreased occurrence of ovality problems. Another technical effect of embodiments of the present invention may include provision of a post-mold treatment process whereby molded articles 206 are subjected to a more aggressive first type of cooling at first and a less aggressive cooling later, thus assisting in reducing occurrence of ovality. Another technical effect of embodiments of the present invention may include improved ease of release due to pre-ejection by the position adjustment structure 222, 222a, 222b. It should be understood that not all technical effects need to be realized in their entirety in each and every embodiment of the present invention.

The description of the embodiments provides examples of the present invention, and these examples do not limit the scope of the present invention. It is understood that the scope of the present invention is limited by the claims. The concepts described above may be adapted for specific conditions and/or functions, and may be further extended to a variety of other applications that are within the scope of the present invention. Having thus described the embodiments, it will be apparent that modifications and enhancements are possible without departing from the concepts as described. Therefore, what is to be protected by way of letters patent are limited only by the scope of the following claims:

What is claimed is:

1. A method of post-mold treatment of a molded article, the method implemented in a molded article receptacle, the method comprising:
    receiving the molded article within the molded article receptacle for post-mold treatment of an outer surface of the molded article in the molded article receptacle;
    at a first instance in time of the post-mold treatment in the molded article receptacle, subjecting the molded article to a first type of post-mold treatment of the outer surface; and
    at a second instance in time of the post mold treatment, actuating the molded article receptacle to subject the molded article to a second type of post-mold treatment of the outer surface.

2. The method of claim 1, wherein said subjecting the molded article to a first type of post-mold treatment comprises subjecting the molded article to a conduction-based cooling.

3. The method of claim 1, wherein said subjecting the molded article to a first type of post-mold treatment comprises subjecting the molded article to a convection-based cooling.

4. The method in accordance with claim 1, wherein said subjecting the molded article to a second type of post-mold treatment comprises subjecting the molded article to a convection-based cooling.

5. The method of claim 1, wherein said subjecting the molded article to a second type of post-mold treatment comprises subjecting the molded article to a conduction-based cooling.

6. The method of claim 1, wherein said molded article receptacle is part of a post-mold treatment device.

7. The method of claim 1, wherein one of said first type of post-mold treatment and said second type of post-mold treatment comprises a non-conductive based cooling.

8. A method of controlling a post-mold treatment process of a molded article, the method executed at a computing apparatus, the method comprising:
    causing a post-mold treatment device to receive the molded article within a molded article receptacle, the molded article receptacle for affecting post-mold treatment of an outer surface of the molded article;
    implement a first portion of the post-mold treatment process of the outer surface of the molded article in the molded article receptacle, the first portion being associated with a first type of post-mold treatment;
    actuating the post-mold treatment device such that the molded article receptacle implements a second portion of the post-mold treatment process of the outer surface of the molded article in the molded article receptacle, the second portion being associated with a second type of post-mold treatment.

9. The method of claim 8, wherein said actuating the post-mold treatment device comprises:
    causing said molded article to move relative to said molded article receptacle to create a clearance.

10. The method of claim 8, said molded article receptacle having a molded article position adjustment structure, wherein said actuating the post-mold treatment device comprises:
    actuating said molded article position adjustment structure between a first position and a second position.

11. The method of claim 9, wherein said molded article position adjustment structure comprises a mechanical ejector rail, and wherein said actuating said molded article position adjustment structure between a first position and a second position comprises:

actuating said mechanical ejector rail between a retracted position and an extended position.

12. The method of claim 11, said molded article position adjustment structure further comprising an active end insert and wherein said actuating said mechanical ejector rail between a retracted position and an extended position further comprises:

actuating said active end insert between a retracted position and an extended position.

13. The method of claim 12, said active end insert comprising a biasing member and wherein said actuating said active end insert between a retracted position and an extended position comprises relying on a force generated by said biasing member.

14. The method of claim 10, wherein said molded article position adjustment structure comprises a molded article engaging surface and a volume defined between the molded article engaging surface and an outer sleeve, the volume being responsive to a flow of coolant therethrough, wherein said actuating said molded article position adjustment structure between a first position and a second position comprises:

actuating said volume between an expanded position and a retracted position.

15. The method of claim 14, wherein said actuating said volume between an expanded position and a retracted position comprises controlling the flow of coolant.

16. The method of claim 10, wherein said first type of post-mold treatment comprises conduction-based cooling and said second type of post-mold treatment comprises a convection-based cooling; and wherein in said second position there is provided a clearance between the molded article and an inner surface of the molded article receptacle, and wherein:

causing the post-mold treatment device to implement a second portion of the post-mold treatment process comprises actuating a source of air to cause ambient air to be drawn past the molded article via the clearance between the molded article and the inner surface of the molded article receptacle.

17. The method of claim 10, wherein said first type of post-mold treatment comprises conduction-based cooling and said second type of post-mold treatment comprises a convection-based cooling; and wherein in said second position there is provided a clearance between the molded article and an inner surface of the molded article receptacle, and wherein:

causing the post-mold treatment device to implement a second portion of the post-mold treatment process comprises actuating a source of air to cause low-pressure air to be forced about the molded article via the clearance between the molded article and the inner surface of the molded article receptacle.

18. The method of claim 10, wherein said first type of post-mold treatment comprises conduction-based cooling and said second type of post-mold treatment comprises a convection-based cooling; and wherein in said second position there is provided a clearance between the molded article and an inner surface of the molded article receptacle, and wherein:

causing the post-mold treatment device to implement a second portion of the post-mold treatment process comprises exerting air through a porous portion of said inner surface of the molded article receptacle.

19. The method of claim 8, wherein said actuating the post-mold treatment device is executed in response to a trigger.

20. The method of claim 19, wherein said trigger comprises appreciating a pre-determined time parameter.

21. The method of claim 19, wherein said trigger comprises receiving an indication of a temperature associated with the molded article being treated in the post-mold treatment device.

* * * * *